United States Patent [19]

Laidlaw et al.

[11] Patent Number: 4,889,460

[45] Date of Patent: Dec. 26, 1989

[54] THREAD CLEANING NUT

[76] Inventors: Curtis L. Laidlaw, 7229 Shaw Rd.; Bradley J. Brewer, 520 Blacks's Corners, both of Imlay City, Mich. 48444

[21] Appl. No.: 222,561

[22] Filed: Jul. 21, 1988

[51] Int. Cl.[4] ............................................. F16B 33/06
[52] U.S. Cl. .................... 411/437; 411/230; 411/936; 10/1 B; 408/215
[58] Field of Search ............. 411/427, 436, 437, 230, 411/240, 107, 188, 144, 936; 10/1 B, 113, 123, 111; 408/215, 216, 219, 218, 217

[56] References Cited

U.S. PATENT DOCUMENTS

| | | | |
|---|---|---|---|
| 561,913 | 6/1896 | Paquette | 411/437 |
| 844,750 | 12/1906 | Rieschick | 411/188 |
| 1,804,058 | 9/1931 | Micha | 411/936 |
| 2,562,032 | 7/1951 | Gutensohn | 411/240 |
| 4,322,195 | 3/1982 | Rebish | 411/431 |

FOREIGN PATENT DOCUMENTS

| | | | |
|---|---|---|---|
| 11141 | 10/1902 | Austria | 411/437 |
| 626290 | 9/1978 | U.S.S.R. | 411/427 |
| 1390927 | 4/1975 | United Kingdom | 411/437 |

*Primary Examiner*—Gary L. Smith
*Assistant Examiner*—F. Saether
*Attorney, Agent, or Firm*—Southfield, MI 48075; Brooks & Kushman

[57] ABSTRACT

A thread cleaning nut including a nut body having a central axis, first and second spaced apart faces formed on the nut body and a central aperture extending through the nut body along a central axis between the first and second faces. A screw thread is formed between the first and second faces within the central aperture wherein less than one-half of the first face is shaped as a first flat surface and more than one-half of the first face is shaped as a second flat surface inclined at an actue angle to the first flat surface. An end portion of the screw thread between the first and second surfaces is exposed to define at least one cutting tooth for cutting a path for the screw thread. The first and second surfaces intersect a third flat surface. The third flat surface intersects the central aperture at a position spaced from the central axis and it intersects the end portion of the screw thread at an acute angle to define a cutting edge of the at least one cutting tooth. Preferably, the first and third surfaces are formed by a single path, straight-line milling operation. Also, preferably, both faces of the nut body are so machined on opposite sides of the central axis.

18 Claims, 1 Drawing Sheet

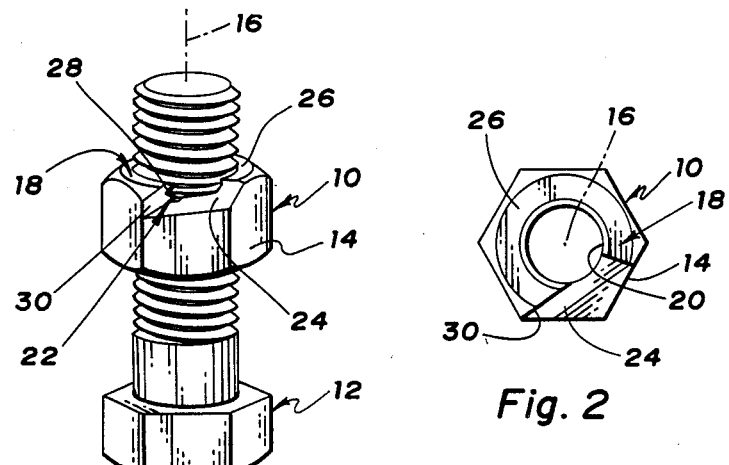
Fig. 1
Fig. 2
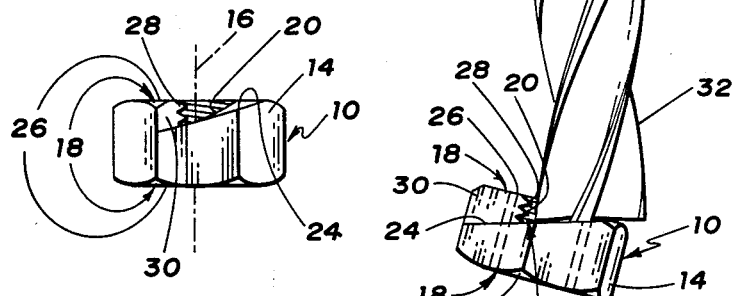
Fig. 3
Fig. 4
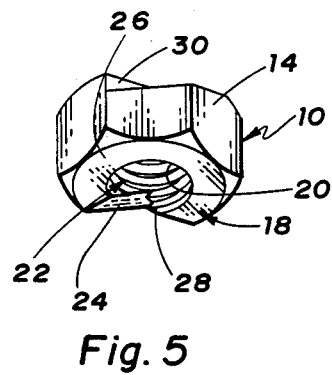
Fig. 5

THREAD CLEANING NUT

TECHNICAL FIELD

This invention relates to thread cleaning nuts and, in particular, to thread cleaning nuts which are relatively easy to form from conventional nuts.

BACKGROUND ART

There are a wide variety of self-cleaning threaded nuts in which the top and bottom faces of the nut have been machined to form an interruption of the threads which allows the nut to clean adjacent threads while turning in either direction.

For example, the U.S. Patent to Pease No. 2,091,274 discloses a thread cleaning nut in which the top and bottom faces of the nut have been machined to form an interruption of the threads which provides for cleaning of adjacent threads.

The U.S. Patents to Crawford No. 3,896,495, Lanius, Jr., 3,501,995, and Paquette 561,913 are further examples of nuts having thread cleaning features.

Other U.S. patents of a more general interest are the U.S. Patents to Schrader No. 1,347,124, Thomas, No. 1,447,578 and Gutensohn No. 2,562,032.

One of the problems with conventional thread cleaning nuts is the number of machine cuts required to produce the thread cutting feature. For example, in the above-noted Pease patent, at least three machine cuts are required, 12 if both faces of the nut are included.

The nut of the Paquette patent requires three straight cuts and three curved cuts. The relatively large number of machine cuts typically makes the product impractical to mass-produce.

Another problem with the prior art is that the end face of the machined nut has a relatively small percentage still intact and what is left is not continuous so that the thread cleaning features may be crushed if the threads are over tightened.

One way to overcome this problem is to make the nut from a harder steel. However, this increases production costs even more. A larger face is desirable since it increases the chance of the nut staying tight in constant pressure motion areas, such as on an engine of an automobile or on heavy equipment.

Another problem generally associated with the prior art is that so many of the designs are not practical and, thus, a relatively hard material must be used for the nut. For example, without harder material, the thread cutting mechanisms of many such designs have a tendecy of breaking off or may get jammed on a dirty or rusty bolt.

SUMMARY OF THE INVENTION

An object of the present invention is to provide a thread cleaning nut which is relatively easy to produce.

Another object of the present invention is to provide a thread cleaning nut which can be easily produced in a simple machining operation.

Yet, still another object of the present invention is to provide a thread cleaning nut which can be produced in a single-pass, straight-line milling operation.

Yet, still further another object of the present invention is to provide a thread cleaning nut which is relatively easy to produce and yet still retains over 50% of its end face to not only protect its cleaning internal thread, but also to insure that the nut stays tightly secured.

In carrying out the above objects and other objects of the present invention, a thread cleaning nut is provided including a nut body having a central axis, first and second spaced apart faces formed on the nut body and a central aperture extending through the nut body along the central axis between the first and second faces. A screw thread is formed between the first and second faces within the central aperture. Less than one-half of the first face is shaped as a first flat surface and more than one-half of the first face is shaped as a second flat surface inclined at an acute angle to the first flat surface. An end portion of the screw thread between the first and second surfaces is exposed to define at least one cutting tooth for cutting a path for the screw thread.

Preferably, each of the first and second faces are machined on opposite sides of the central axis by a single-pass, straight-line milling operation.

The advantages accruing to such a thread cleaning nut are numerous. For example, the nut need not be specially hardened, but may be formed from a low to medium carbon steel. Also, a relatively large surface area of the face of the thread cleaning nut still remains intact after the milling operation to ensure that not only the cleaning features of thread remain intact, but also more than 50% of the face of the nut is still useful to secure the nut.

The advantages of the present invention will be readily appreciated as the same because better understood by the following detailed description when considered with the accompanying drawings.

BRIEF DESCRIPTION OF THE DRAWINGS

FIG. 1 is a perspective view, illustrating the thread cleaning nut of the present invention on a bolt;

FIG. 2 is a top plan view of the thread cleaning nut;

FIG. 3 is a side elevational view of the thread cleaning nut;

FIG. 4 is a view illustrating the machining operation which forms the thread cleaning nut; and FIG. 5 is a perspective view illustrating the thread cleaning nut of the present invention wherein both of its end faces have been machined to provide thread cleaning features on both faces thereof.

BEST MODE FOR CARRYING OUT THE INVENTION

Referring now to the drawing figures, there is illustrated in FIG. 1, a thread cleaning nut constructed in accordance with the present invention, generally indicated at reference numeral 10. The thread cleaning nut 10 is illustrated threaded on a bolt, generally indicated at 12. As will be described in greater detail hereinbelow, the nut 10 is adapted to clean a thread of the bolt 12 or other threaded fasteners such as a screw.

The nut 10 includes a nut body 14, having a central axis 16. The nut 10 also includes first and second spaced apart faces 18 formed on the nut body 14. A central aperture 20 extends through the nut body 14 along the central axis 16 between the first and second faces 18. A screw thread, generally indicated at 22, is formed between the first and second faces 18 within the central aperture 20.

As best shown in FIG. 2, less than one-half of the first face 18 is shaped as a first flat surface 24 and more than one-half of the first face 18 is shaped as a second flat surface 26 which is inclined at an acute angle to the first flat surface as is best shown in FIG. 3.

As best shown in FIG. 3, an end portion 28 of the screw thread 22 between the first and second surfaces 24 and 26, respectively, defines at least one cutting tooth and, preferably, two cutting teeth for cutting a path for the screw thread 22.

The first and second surfaces 24 and 26, respectively, also intersect a third flat surface 30. The third flat surface 30 intersects the central aperture 20 at a position spaced from the central axis 16 and further intersects the end portion 28 of the screw thread 22 at an acute angle to define cutting edges on the cutting teeth.

Referring now to FIG. 4, there is illustrated a milling tool 32 wherein both the first and third surfaces 24 and 30 are formed by a single pass, straight-line milling operation with the nut 10 held at an inclined position. As can be seen from the drawing figures, the third flat surface 30 with respect to the second flat surface 26 as a result of the inclined position of the nut 10 during the milling operation.

Preferably, the nut is made from a low to medium carbon steel and there is no need to form the nut 10 from an extra strong metal.

Referring now to FIG. 5, there is illustrated the thread cleaning nut 10 having both of its end faces 18 formed with the thread cleaning features on opposite sides of the central axis 16 so that the nut 10 can clean bolts, such as the bolt 12, during both threading and unthreading operations. In other words, the cutting edges of the cutting teeth clean the thread of the bolt during threading operation and during unthreading operation.

The advantages accruing to the invention as described above are numerous. For example, the nut 10 is relatively easy to machine and the nut 10 need not be formed from extra strong steels. The nut 10 also protects the thread cleaning features from collapse during use while still retaining a sufficient amount of the first and second faces 18 as bearing surfaces against a part to be secured by the nut 10.

While the best mode for carrying out the invention has herein been described in detail, those familiar with the art to which this invention relates will recognize various alternative designs and embodiments for practicing the present invention as defined by the following claims.

What is claimed is:

1. A thread cleaning nut for cleaning the thread of a bolt or the like, the nut comprising:
   a nut body having a central axis;
   first and second spaced apart faces formed on the nut body;
   a central aperture extending through the nut body along the central axis between the first and second faces; and
   a screw thread formed between the first and second faces within the central aperture, wherein less than one-half of the first face is shaped as a first flat surface and more than one-half of the first face is shaped as a second flat surface inclined at an acute angle to the first flat surface, and wherein an end portion of the screw thread between the first and second surfaces is exposed to define at least one cutting tooth for cutting a path for the screw thread wherein the first and second surfaces intersect a third flat surface, the third flat surface intersecting the first flat surface at an edge inclined with respect to the second flat surface, the third flat surface intersecting the central aperture in a plane spaced from the central axis and intersecting the end portion of the screw thread at an acute angle to define an acutely angled cutting edge of the at least one cutting tooth, the cutting edge cleaning the thread of the bolt during one of a threading operation and an unthreading operating.

2. The nut of claim 1 wherein the third flat surface is substantially perpendicular to the second flat surface.

3. The nut of claim 1 wherein more than sixty percent of the first face is shaped as the second flat surface.

4. The nut of claim 1 or claim 3 wherein the second flat surface is continuous.

5. The nut of claim 1 wherein the first flat surface is formed by milling.

6. The nut of claim 1 wherein at least one of the first and third surfaces is formed by milling.

7. The nut of claim 6 wherein both of the first and third surfaces are formed by a single-pass, straight-line milling operation.

8. The nut of claim 1 wherein the screw thread is continuous between the second face and the first surface of the first face.

9. The nut of claim 1 wherein the nut is made from a low to medium carbon steel.

10. The nut of claim 4 wherein the first flat surface is continuous.

11. The nut of claim 1 wherein the first surface is formed by a single-pass, straight-line milling operation.

12. A thread cleaning nut for cleaning the thread of a bolt or the like, the nut comprising:
    a nut body having a central axis;
    first and second spaced apart faces formed on the nut body;
    a central aperture extending through the nut body along the central axis between the first and second faces; and
    a screw thread formed between the first and second faces within the central aperture, wherein less than one-half of each of the first and second faces is shaped as a first flat surface and more than one-half of the first and second faces is shaped as a second flat surface inclined at an acute angle to the first flat surface, and wherein opposite end portions of the screw thread between the first and second surfaces of each face are exposed to define at least one cutting tooth for cutting the path for the screw thread wherein the first and second surfaces of each face intersect a third flat surface, each third flat surface intersecting the first flat surface at an edge inclined with respect to the second flat surfaces, the third flat surfaces intersecting the central aperture in planes on opposite sides of and spaced from the central axis and each third flat surface intersecting their respective end portion of the screw thread at an acute angle to define an acutely angled cutting edge of their respective at least one cutting tooth, each cutting edge cleaning the thread of the bolt during threading and unthreading operations.

13. The nut of claim 12 wherein the first flat surface of each face is formed by milling.

14. The nut of claim 12 wherein both of the first and third surfaces of each face are machined by a single-pass, straight-line milling operation on opposite sides of the central axis.

15. The nut of claim 12 wherein the nut is made from a low to medium carbon steel.

16. The nut of claim 15 wherein the first surface of each face is formed by a single-pass, straight-line milling operation.

17. A thread cleaning nut for cleaning the thread of a bolt or the like, the nut comprising:
 a nut body having a central axis;
 first and second spaced apart faces formed on the nut body;
 a central aperture extending through the nut body along the central axis between the first and second faces; and
 a screw thread formed between first and second faces within the central aperture, wherein less than one-half of the first face is shaped as a first flat surface and more than one-half of the first face is shaped as a second flat surface inclined at an acute angle to the first flat surface, and wherein an end portion of the screw thread between the first and second surfaces is exposed to define at least one cutting tooth for cutting a path for the screw thread, the first and second surfaces intersecting a third flat surface, the third flat surface intersecting the first flat surface at an edge inclined with respect to the second flat surface, the third flat surface intersecting the central aperture in a plane spaced from the central axis and intersecting the end portion of the screw thread at an acute angle to define an acutely angled cutting edge of the at least one cutting tooth, both of the first and third surfaces being machined by a single-pass, straight-line milling operation, the cutting edge cleaning the thread of the bolt during one of a threading operations and an unthreading operation.

18. The nut of claim 17 wherein the nut is made from a low to medium carbon steel.

* * * * *